United States Patent [19]
Ito

[11] Patent Number: 5,176,369
[45] Date of Patent: Jan. 5, 1993

[54] FLUID-FILLED CYLINDRICAL ELASTIC MOUNT HAVING RIGID PROTRUSION AXIALLY DEFINING FLUID CHAMBER

[75] Inventor: Michio Ito, Inuyama, Japan
[73] Assignee: Tokai Rubber Industries, Ltd., Japan
[21] Appl. No.: 810,108
[22] Filed: Dec. 19, 1991

[30] Foreign Application Priority Data
Dec. 28, 1990 [JP] Japan .................. 2-416383

[51] Int. Cl.$^5$ .................. F16F 1/36; F16M 13/00; B60G 11/26
[52] U.S. Cl. .................. 267/140.13; 267/220; 280/710; 280/716
[58] Field of Search .................. 267/140.1 C, 140.1 A, 267/219, 220; 280/716, 710, 668, 673; 248/562, 636, 638; 180/300, 312, 902

[56] References Cited
U.S. PATENT DOCUMENTS

| | | | |
|---|---|---|---|
| 4,005,810 | 4/1991 | Sawada et al. | 267/140.1 A |
| 4,763,884 | 8/1988 | Matsui et al. | 267/140.1 C |
| 4,786,036 | 11/1988 | Kanda | 267/140.1 C |
| 4,877,262 | 10/1989 | Tanahashi et al. | 280/716 X |
| 4,883,260 | 11/1989 | Kanda | 267/140.1 C |
| 5,024,461 | 6/1991 | Miyakawa et al. | 280/716 X |
| 5,040,775 | 8/1991 | Miyakawa | 267/220 |
| 5,080,330 | 1/1992 | Nanno | 267/140.1 C |

Primary Examiner—Douglas C. Butler
Attorney, Agent, or Firm—Parkhurst, Wendel & Rossi

[57] ABSTRACT

A fluid-filled cylindrical elastic mount including an inner sleeve, an outer sleeve, at least one elastic body disposed between these sleeves for flexible connection therebetween. The elastic mount has at least one fluid chamber extending in a circumferential direction of the mount between the two sleeves. The elastic mount further includes a wing member fixed to one of the inner and outer sleeves so as to protrude toward the other sleeve. Each fluid chamber is divided by the wing member into two axially opposite sections. Between a radial end face of the wing member and an inner wall of each fluid chamber is defined a restricted fluid passage which has a predetermined radial dimension and communicates with the two sections. The elastic mount has at least one rigid protrusion protruding radially from the other sleeve by a radial distance which is larger than the predetermined radial dimension of the restricted fluid passage. The rigid protrusion(s) defines at least one of axially opposite ends of at least a radial portion of the fluid chamber(s), which ends are opposed to each other in an axial direction of the mount.

13 Claims, 6 Drawing Sheets

FLUID-FILLED CYLINDRICAL ELASTIC MOUNT HAVING RIGID PROTRUSION AXIALLY DEFINING FLUID CHAMBER

BACKGROUND OF THE INVENTION

1. Field of the Invention

The present invention relates in general to a fluid-filled cylindrical elastic mount which provides a vibration isolating effect based on flow of fluid contained therein, and more particularly to such an upper support which is capable of effectively isolating vibrations applied in the axial direction of the mount, and which is favorably used as an upper support in a suspension system of a motor vehicle, or a vehicle member mount, for example.

2. Discussion of the Prior Art

A so-called cylindrical elastic mount is known as one type of a mounting device which is interposed between two members of a vibration system for flexibly connecting the two members in a vibration-isolating fashion. This cylindrical elastic mount is constructed with an elastic or rubber body being formed between an inner metal sleeve, and an outer metal sleeve disposed radially outwardly of the inner sleeve with a suitable radial spacing therebetween. The elastic body elastically connects the inner and outer sleeves. The thus constructed elastic mount is adapted to mainly isolate input vibrations applied between the inner and outer sleeves in the axial direction of the mount. For example, the elastic mount of this type is widely used as an upper support in a suspension system, a strut bar cushion, or a member mount for a motor vehicle.

To meet increasing requirements for enhanced vibration isolating characteristics on recent high-grade cars, there has been proposed a fluid-filled cylindrical elastic mount having a fluid chamber which extends in the circumferential direction between the inner and outer sleeves, and which is filled with a non-compressible fluid. The elastic mount further includes a wing member which protrudes from one of the inner and outer sleeves toward the other in the fluid chamber, so as to substantially divide the fluid chamber into two sections. The wing member has a radial end face which cooperates with a radially opposed wall of the fluid chamber to define therebetween a restricted passage which communicates with the two sections.

Upon application of vibrations between the inner and outer sleeves in the axial direction of the mount, the wing member is axially displaced in the fluid chamber, causing the fluid to flow between the two sections through the restricted passage. Consequently, the fluid-filled cylindrical elastic mount provides an intended vibration isolating effect based on the fluid flow through the restricted passage.

In the fluid-filled cylindrical elastic mount, the fluid chamber is axially defined by respective elastic walls formed as part of the above-indicated elastic body connecting the inner and outer sleeves. Upon application of the vibrations between the inner and outer sleeves, the axially opposite elastic walls of the fluid chamber are strained and deformed by the inner or outer sleeve, in the same axial direction in which the wing member is displaced in the fluid chamber. Such deformation of the axially opposite walls of the fluid chamber results in reduction in the substantial amount of the axial displacement of the wing member in the fluid chamber, and resultant reduction in the amount of relative volumetric changes between the two sections of the chamber. Consequently, the amount of the fluid flowing through the restricted passage is reduced, resulting in deterioration of the vibration isolating effect of the mount based on the fluid flow through the restricted passage.

SUMMARY OF THE INVENTION

It is therefore an object of the present invention to provide a fluid-filled cylindrical elastic mount which ensures a sufficiently large amount of the fluid which is caused to flow through a restricted passage upon application of axial vibrations, assuring an improved vibration isolating effect based on the fluid flow through the restricted passage.

The above object may be attained according to the principle of the present invention, which provides a fluid-filled cylindrical elastic mount for flexibly connecting two members, comprising: (a) an inner sleeve fixed to one of the two members; (b) an outer sleeve disposed radially outwardly of the inner sleeve and connected to the other of the two members; (c) at least one elastic body disposed between the inner and outer sleeves for flexible connection therebetween, the above-indicated at least one elastic body at least partially defining at least one fluid chamber filled with a non-compressible fluid and extending in a circumferential direction of the mount between the inner and outer sleeves; (d) a wing member fixed to one of the inner and outer sleeves so as to protrude from the one sleeve toward the other, the wing member being disposed at an axially intermediate portion of each fluid chamber such that the fluid chamber is divided into two sections located on axially opposite sides of the wing member, the wing member having a radial end face which cooperates with an inner wall of the fluid chamber to define therebetween a restricted fluid passage having a predetermined radial dimension and communicating with the two sections; and (e) at least one rigid protrusion protruding radially from the other of the inner and outer sleeves, by a radial distance which is larger than the predetermined radial dimension of the restricted fluid passage, the rigid protrusion(s) defining at least one of axially opposite ends of at least a radial portion of the fluid chamber(s), which ends are opposed to each other in an axial direction of the mount.

In the fluid-filled cylindrical elastic mount constructed according to the present invention, at least one of axially opposite walls defining the fluid chamber, or at least a radial portion of the chamber which is concentric or radially aligned with the restricted passage, is substantially formed as a rigid wall including the radial rigid protrusion. Upon application of a vibrational load in the axial direction of the mount, therefore, the wing member provided in the fluid chamber is effectively moved toward and away from the rigid wall or walls, assuring a sufficient amount of relative volumetric changes between the two sections of the fluid chamber, and an accordingly increased amount of the fluid flow between the two sections through the restricted passage.

Due to the increase in the amount of the fluid flowing through the restricted passage, the fluid-filled cylindrical elastic mount exhibits a significantly enhanced vibration isolating effect based on the resonance of the fluid mass flowing through the restricted passage.

BRIEF DESCRIPTION OF THE DRAWINGS

The above and optional objects, features and advantages of the present invention will be better understood by reading the following description of one presently preferred embodiment of the invention, when considered in conjunction with the accompanying drawings, in which.

DETAILED DESCRIPTION OF THE PREFERRED EMBODIMENT

Figure 1:
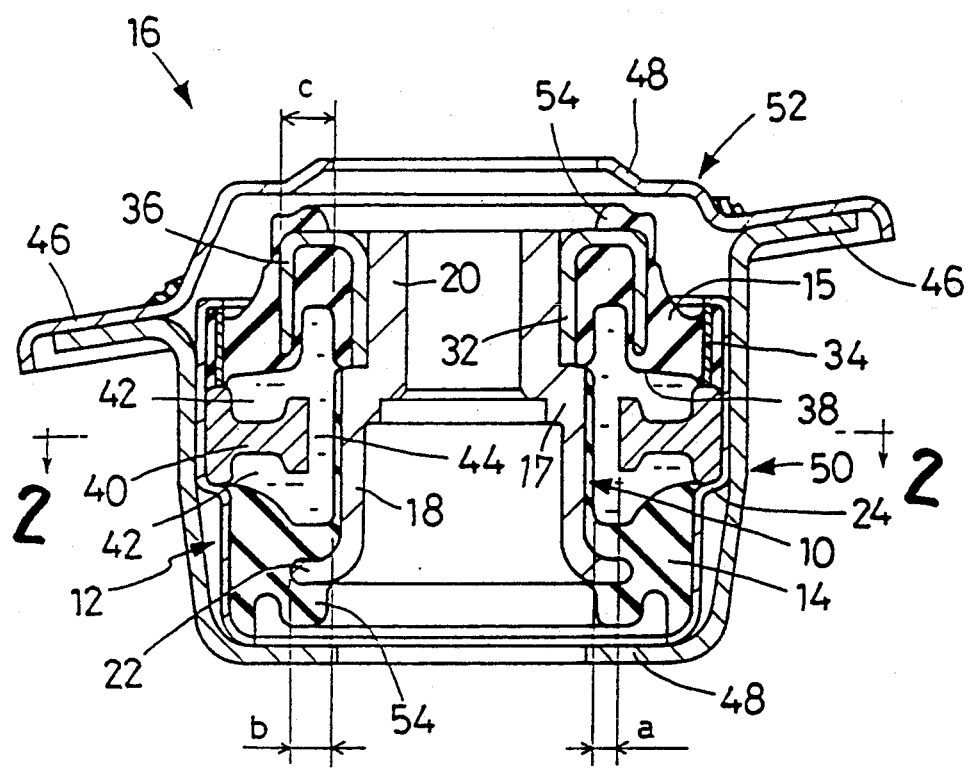
FIG. 1 is an elevational view in axial cross section of one embodiment of the present invention in the form of an upper support used in a suspension system for a motor vehicle.
Figure 2:
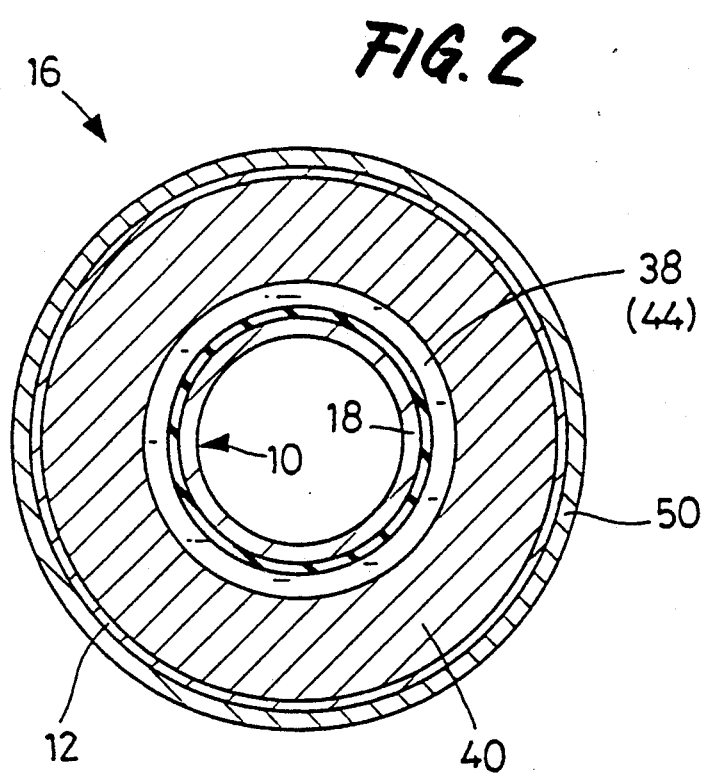
FIG. 2 is a transverse cross sectional view taken along line 2—2 of FIG. 1.

Referring first to FIGS. 1 and 2, there is shown one embodiment of the present invention in the form of an upper support 16 used in a suspension system of a motor vehicle. The upper support 16 includes an inner metal sleeve 10, and an outer metal sleeve 12 disposed radially outwardly of the inner sleeve 10. These inner and outer metal sleeves 10, 12 are elastically connected to each other by a first and a second rubber body 14, 15 interposed therebetween. This upper support 16 is installed on the motor vehicle such that the inner sleeve 10 is fixed to a shock absorber of the suspension system while the outer sleeve 12 is fixed to the vehicle body. Thus, the upper support 16 is adapted to elastically connect the shock absorber and the vehicle body, in a vibration damping or isolating manner.

Figure 3:
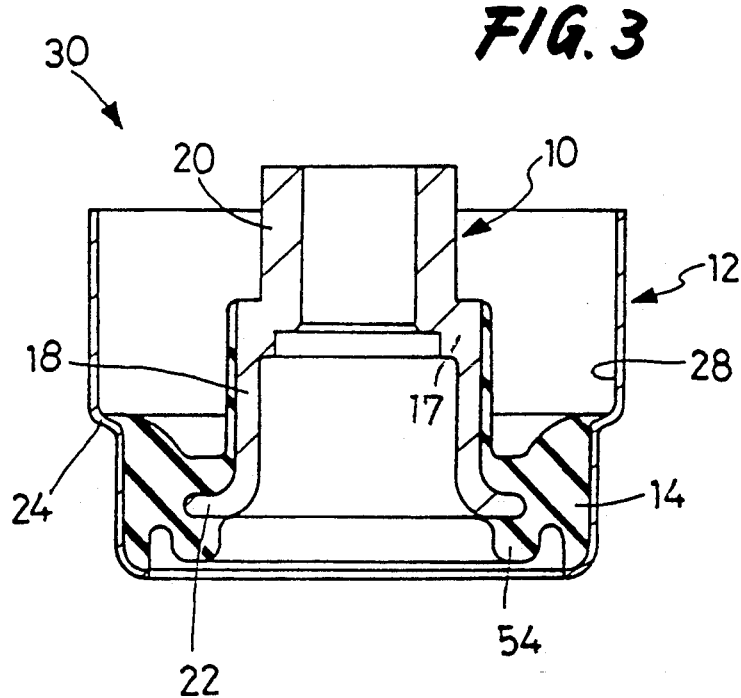
FIG. 3 is an axial cross sectional view showing an inner assembly of the upper support of FIG. 1, which is obtained by vulcanization of a rubber material for a first rubber body.

More specifically, the inner sleeve 10 is a relatively thick-walled, generally cylindrical metallic member having an axially intermediate stepped portion 17, and a large-diameter portion 18 and a small-diameter portion 20 which are located on the axially opposite sides of the stepped portion 17, as shown in FIG. 3. The inner sleeve 10 is formed integrally with a first rigid protrusion 22 in the form of an annular outward flange, which protrudes radially outwards from an open end of the large-diameter portion 18.

The outer sleeve 12 is a relatively thin-walled, generally cylindrical metallic member having an axially intermediate stepped portion 24. The outer sleeve 12 is disposed coaxially with and radially outwardly of the inner sleeve 10, with a suitable radial spacing therebetween, such that a small-diameter portion of the outer sleeve 12 is opposed to the large-diameter portion 18 of the inner sleeve 10 in the radial direction.

With the inner and outer sleeves 10, 12 positioned relative to each other as described above, the first rubber body 14 having an annular shape is interposed between the large-diameter portion 18 of the inner sleeve 10 and the small-diameter portion of the outer sleeve 12, so as to elastically connect the inner and outer sleeves 10, 12 at their corresponding axial end portions. Consequently, an annular space 28 is formed between the inner and outer sleeves 10, 12, as shown in FIG. 3, such that the space 28 is open at the other axial ends of the sleeves 10, 12 remote from the first rubber body 14. Namely, the first rubber body 14 is secured at its inner circumferential surface to the large-diameter portion 18 of the inner sleeve 10, and at its outer circumferential surface to the small-diameter portion of the outer sleeve 12, by means of vulcanization of a rubber material for the rubber body 14. Thus, there is prepared an inner assembly 30 as shown in FIG. 3, in which the inner and outer sleeves 10, 12 are formed as a unit with the first rubber body 14. In this inner assembly 30, the first rigid protrusion 22 of the inner sleeve 10 is embedded over a given radial length in the first rubber body 14, so as to limit the amount of deformation of a radially inner portion of the first rubber body 14.

Figure 4:
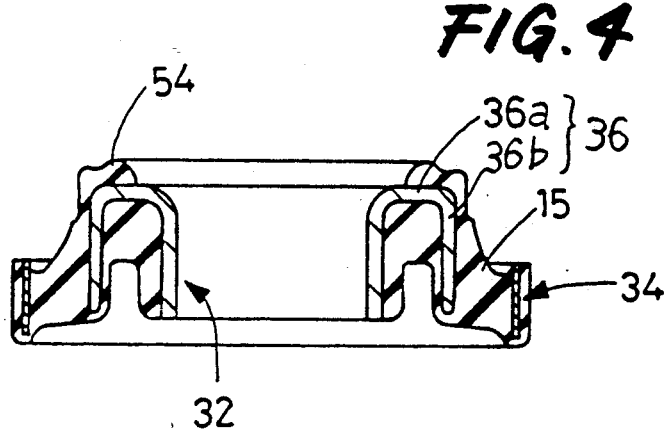
FIG. 4 is an axial cross sectional view showing a second rubber body of the upper support of FIG. 1.

The thus constructed inner assembly 30 is assembled with the second rubber body 15 such that the rubber body 15 is disposed between the axial end portions of the inner and outer sleeves 10, 12 at which the annular space 28 is open. Described more specifically referring to FIG. 4, the second rubber body 15 has a generally annular shape, and is secured at its radially inner and outer portions to an inner and an outer support member 32, 34, respectively, by means of vulcanization. These inner and outer support members 32, 34 are made of metal and have a generally cylindrical shape. As indicated in FIG. 4, the inner support member 32 has a second rigid protrusion 36 which includes a first part 36a extending radially outwards from one axial end of the member 36, and a second part 36b extending axially inwards from the radial end of the first part 36a. Thus, the inner support member 32 as a whole is U-shaped in transverse cross section, as shown in FIG. 4. The first part 36a of the second rigid protrusion 36 of the inner support member 32 is embedded over a given radial length in the second rubber body 15, so as to limit the amount of deformation of a radially inner portion of the second rubber body 15.

Then, the second rubber body 15 with the inner and outer support members 32, 34 is mounted on the inner assembly 30. More specifically, the inner support member 32 is press-fitted on the inner sleeve 10, while the outer support member 34 is inserted into a large-diameter portion of the outer sleeve 12, and fixed in position by caulking an axial end portion of the outer sleeve 12. With the second rubber body 15 thus mounted on the inner assembly 30, the opening of the annular space 28 is fluid-tightly closed by the rubber body 15, whereby an annular fluid chamber 38 is formed within the space 28. This fluid chamber 38 is filled with a suitable non-compressible fluid, such as water, alkylene glycol, polyalkylene glycol, silicone oil and mixtures thereof.

Within the fluid chamber 38, there is accommodated a wing member 40 in the form of a generally annular plate as shown in FIGS. 1 and 2. The wing member 40 has an inside diameter which is larger by a given value than the outside diameter of the large-diameter portion 18 of the inner sleeve 10, and an outside diameter which is substantially equal to the inside diameter of the large-diameter portion of the outer sleeve 12. The wing member 40 is inserted into the space 28 of the inner assembly 30 prior to the mounting of the second rubber body 15 on the inner assembly 30. Then, the wing member 40 is axially gripped at its radially outer peripheral portion, by and between the stepped portion 24 of the outer sleeve 12, and the outer support member 34 secured to the second rubber body 15. Thus, the wing member 12 is fixedly supported by the outer sleeve 12, at an axially intermediate portion of the fluid chamber 38.

The wing member 40 is adapted to substantially divide the fluid chamber 38 into a pair of annular sections 42, 42, which are located on axially opposite sides of the wing member 40. Between the inner circumferential surface of the wing member 40 and the radially opposed wall of the fluid chamber 38, there is formed an annular restricted passage 44 having a radial dimension "a" (FIG. 1), which continuously extends around the inner sleeve 10 in the circumferential direction. The annular restricted passage 44 communicates with the two sections 42, 42 of the fluid chamber 38 so as to allow the passage of the fluid between the sections 42. In the instant embodiment, the axial length, cross sectional area and other dimensions of the restricted passage 44 are determined so that the upper support 16 exhibits a reduced dynamic spring constant with respect to high-frequency vibrations such as booming noise, based on resonance of the fluid mass flowing through the restricted passage 44.

The above-indicated radial dimension "a" of the restricted passage 44 is determined to be smaller than radial lengths "b" and "c" (FIG. 1) of the respective first and second rigid protrusions 22, 36 embedded in the first and second rubber bodies 14, 15, as measured from the inner circumferential wall of the fluid chamber 38 which is radially opposed to the wing member 40. In other words, the first and second rigid protrusions 22, 36 protrude radially outwards from the inner circumferential wall of the chamber 38, by the respective radial lengths "b", "c" which are larger than the radial dimension "a" of the restricted passage 44. It follows from the above description that the fluid chamber 38, or at least a radially inner portion including the restricted passage 44, is axially defined by rigid walls, which are substantially constituted by the first and second rigid protrusions 22, 36, since the amounts of axial deformation of the radially inner portions of the first and second rubber bodies 14, 15 are limited by the respective rigid protrusions 22, 36. That is, the rigid protrusions 22, 36 function as rigid walls which substantially define the axially outer ends of respective radial portions of the fluid chamber sections 42, 42 which are radially aligned or concentric with the annular restricted passage 44.

To the thus obtained assembly including the inner and outer sleeves 10, 12 and the first and second rubber bodies 14, 15, there are attached a lower mounting bracket 50 and an upper mounting bracket 52 such that these brackets 50, 52 are axially superposed on each other with the assembly interposed therebetween. Each mounting bracket 50, 52 has an outward flange 46 at one of axially opposite open ends thereof, and an inward flange 48 at the other axial open end. With the outward flanges 46, 46 superposed on and fixed to each other, these mounting brackets 50, 52 are fixedly attached to the outer sleeve 12. In this state, the inward flanges 48, 48 of the mounting brackets 50, 52 are respectively opposed to the first rigid protrusion 22 of the inner sleeve 10, and the second rigid protrusion 36 of the inner support member 32, with suitable spacings therebetween, in the axial direction of the upper support 16. On the axial end faces of the first and second rigid protrusions 22, 36, there are provided respective buffer rubber blocks 54, 54 formed as part of the first and second rubber bodies 14, 15, such that the buffer blocks 54, 54 protrude toward the inward flanges 48, 48 of the lower and upper mounting brackets 50, 52, respectively. Upon application of vibrations to the upper support 16, therefore, the amounts of relative displacement of the inner and outer sleeves 10, 12, as well as the amounts of deformation of the first and second rubber bodies 14, 15, are limited by abutting contact between the first and second rigid protrusions 22, 36 and the inward flanges 48, 48 of the brackets 50, 52, through the buffer rubber blocks 54, 54.

In the thus constructed upper support 16, when a vibrational load is applied between the inner and outer sleeves 10, 12 in the axial direction of the mount (the vertical direction as seen in FIG. 1), the wing member 40 is displaced in the fluid chamber 38, integrally together with the outer sleeve 12, so that relative volumetric changes occur between the two sections 42, 42 of the fluid chamber 38. As a result, the fluid is forced to flow between the two sections 42, 42 through the annular restricted passage 44, whereby the upper support 16 exhibits a significantly reduced dynamic spring constant with respect to high-frequency vibrations such as booming noise, based on the resonance of the fluid mass flowing through the restricted passage 44. In the instant upper support 16, in particular, the fluid chamber 38, or at least its radially inner portion including the restricted passage 44, is axially defined substantially by the rigid walls including the first and second rigid protrusions 22, 36, as described above. When the upper support 16 receives the high-frequency vibrations, the first and second rigid protrusions 22, 36 integral with the inner sleeve 10 are displaced relative to the wing member 40, whereby the volumes of the two sections 42, 42 are more effectively varied relative to each other, thereby causing effective fluid flows through the restricted passage 44.

Figure 5:
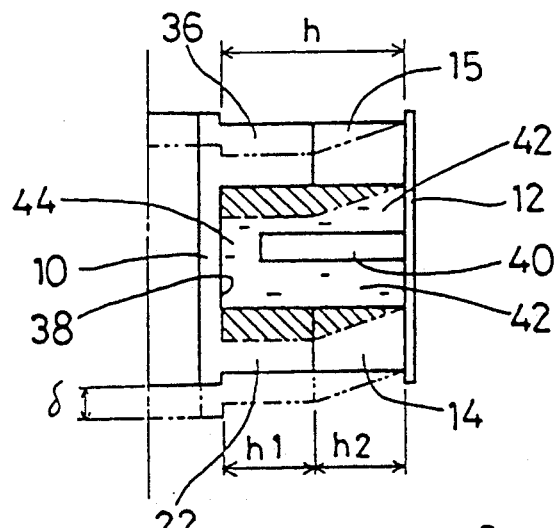
FIG. 5 is a schematic explanatory view of a part of the upper support of FIG. 1, which part is particularly relevant to the present invention.

Referring next to FIG. 5, there is schematically shown a part of the upper support 16 which is relevant to the principle of the present invention. When the inner and outer sleeves 10, 12 are axially displaced relative to each other by an axial distance $\delta$, upon application of a vibrational load, the amount of relative volumetric changes (indicated by hatched areas in FIG. 5) per unit length between the two sections 42, 42 is generally represented by the following formula (1):

$$\delta h_1 + (\tfrac{1}{2})\delta h_2 \tag{1}$$

where, h = radial length of axially opposite walls of the fluid chamber 38 h1 = radial length (b) of the first rigid protrusions 22 = radial length (c) of the second protrusion 36 h2 = h − h1.

Figure 6:
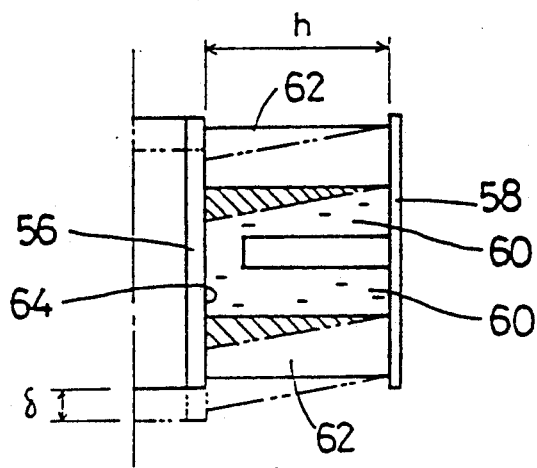
FIG. 6 is a schematic explanatory view showing a corresponding part of a known upper support, for comparison with the upper support as shown in FIG. 5.

FIG. 6 schematically shows one example of known upper support having a fluid chamber 64 axially defined by axially opposite walls 62, 62, which are composed entirely of rubber bodies. Namely, no rigid members or protrusions are incorporated in the axially opposite walls 62, 62. When inner and outer sleeves 56, 58 of the known upper support are axially displaced relative to each other by the axial distance δ, upon application of a vibrational load, the amount of relative volumetric changes (indicated by hatched areas in FIG. 6) per unit length between two sections 60, 60 is generally represented by the following formula (2):

$$(\tfrac{1}{2})\delta(h1+h2) \qquad (2)$$

It will be understood from FIGS. 5 and 6 that the upper support 16 of the present invention ensures a larger amount of relative volumetric changes between the two sections 42, 42, i.e., a larger amount of the fluid flowing through the restricted passage 44, than the known upper support. The difference in the amount of the relative volumetric changes between the present and known upper supports is represented by the following formula (3). Consequently, the upper support 16 of the invention provides a significantly reduced dynamic spring constant, based on the resonance of the fluid mass in the restricted passage 44.

$$[\delta h1 + (\tfrac{1}{2})\delta h2] - [(\tfrac{1}{2})\delta(h1+h2)] = (\tfrac{1}{2})\delta h1 \qquad (3)$$

Figure 7:
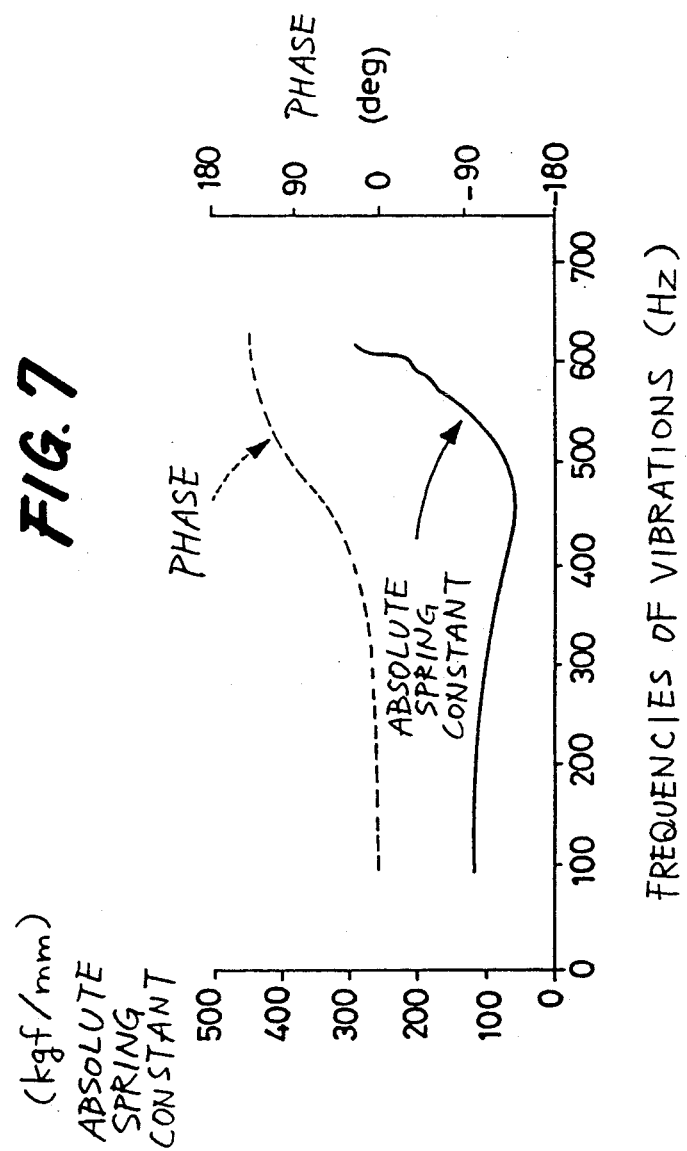
FIG. 7 is a graph indicating the relationship between vibration isolating characteristics of the upper support of FIG. 1, and frequencies of vibrations applied thereto.
Figure 8:
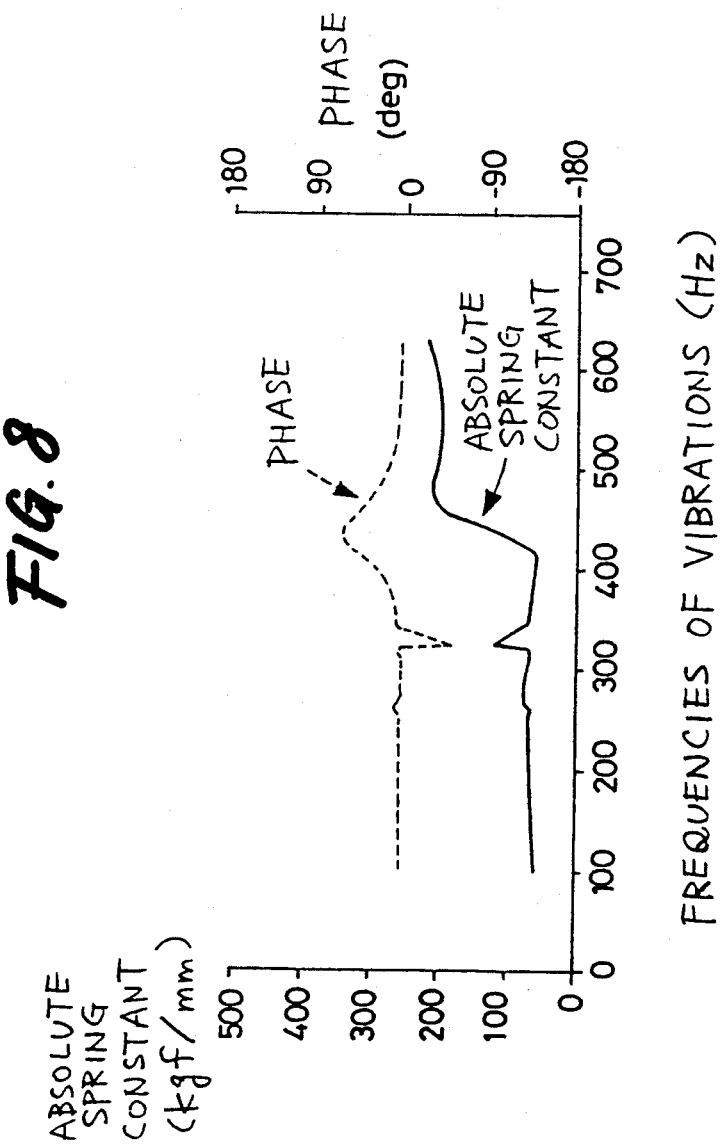
FIG. 8 is a graph indicating the relationship between vibration isolating characteristics of the known upper support as partly shown in FIG. 5, and frequencies of vibrations applied thereto.

The upper support 16 constructed according to the instant embodiment was tested on its vibration isolating characteristics in relation to the frequency of vibrations applied thereto. The result of the test is shown in FIG. 7. FIG. 8 shows the result of the same test conducted on the above-described known upper support having no axially opposite rigid walls like the first and second rigid protrusions 22, 36. It will be understood from FIGS. 7 and 8 that the phase angle of the upper support 16 of the instant embodiment, which reflects the degree of vibration isolating effect due to the fluid contained therein, is about twice that of the known upper support. Further, the present upper support 16 exhibits a considerably lowered absolute dynamic spring constant with respect to vibrations of not higher than 500Hz, which are particularly required to be isolated in practical use of the upper support.

While the present invention has been described in its presently preferred embodiment, for illustrative purpose only, it is to be understood that the invention is not limited to the details of the illustrated embodiment, and the invention may be otherwise embodied.

In the illustrated embodiment, the wing member 40 is fixedly attached to the outer sleeve 12 so as to divide the fluid chamber 38 into the two sections 42, 42, and partially defines the restricted passage 44. However, the wing member may be supported by the inner sleeve 10 such that the wing member protrudes radially outwards from the inner sleeve 10 toward the outer sleeve 12. In this case, the annular restricted passage is formed between the outer circumferential surface of the wing member, and the radially opposed wall of the fluid chamber. In this case, the rigid protrusions protrude from the outer member 12 toward the inner member 10, so as to avoid unfavorable deformation of the axially opposite walls of the fluid chamber.

In the illustrated embodiment, the axially opposite walls of the fluid chamber 38 include the respective rigid protrusions 22, 36 for avoiding axial deformation of the walls. However, only one of the axially opposite walls may include such a rigid protrusion.

The construction of the rigid protrusion is by no means limited to that of the illustrated embodiment, provided the protrusion is formed so as to protrude from the sleeve 10, 12 in the radial direction of the mount.

In the illustrated embodiment, the single annular fluid chamber 38 is formed over the entire circumference between the inner and outer sleeves 10, 12. However, it is possible to form a plurality of fluid chambers between the inner and outer sleeves, such that the fluid chambers are spaced from each other in the circumferential direction of the mount.

Further, the wing member firmly fixed to one of the inner and outer sleeves 10, 12 may cooperate with the rigid protrusion(s) firmly fixed to the other sleeve 12, 10 to provide stopper means for preventing excessive relative displacement between the inner and outer sleeves 10, 12 in the axial direction of the mount, by means of abutting contact between the wing member and the protrusion(s).

Although the illustrated embodiment of the present invention takes the form of an upper support used in a suspension system of a motor vehicle, it is to be understood that the principle of the present invention is equally applicable to other mounting devices such as a strut bar cushion or a member mount for a motor vehicle, and mounting devices used in various equipment and machinery other than the motor vehicle.

It is also to be understood that the present invention may be embodied with various changes, modifications and improvements other than those indicated above, which may occur to those skilled in the art, without departing from the spirit and scope of the invention defined in the following claims.

What is claimed is:

1. A fluid-filled cylindrical elastic mount for flexibily connecting two members, comprising:

an inner sleeve fixed to ne of the two members;

an outer sleeve disposed radially outwardly of said inner sleeve and connected to the other of the two members;

at least one elastic body disposed between the inner and outer sleeves for flexible connection therebetween, said at least one elastic body at least partially defining at least one fluid chamber filled with a non-compressible fluid and extending a circumferential direction of the mount between the inner and outer sleeves;

a wing member fixed to one of the inner and outer sleeves so as to protrude from said one sleeve toward the other of said inner and outer sleeves, and so as to be displaceable together with said one sleeve in an axial direction of the mount when the mount receives a vibrational load in said axial direction, said wing member being disposed at an axially intermediate portion of each of said at least one fluid chamber such that said each fluid chamber is divided into two sections located on axially opposite sides of said wing member, sic wing member having a radial end face which cooperates with an inner wall of said each fluid chamber to define therebetween a restricted fluid passage having a predetermined radial dimension and communicating with said two sections; and at least one rigid protrusion protruding radially from the other of said inner and outer sleeves, by a radial distance which is larger than said predetermined radial dimension of said restricted fluid passage, said at least one rigid protrusion defining at least one of axially opposite ends of tat least a radial portion of said at least one fluid chamber, said radial portion being aligned with said restricted fluid passage in a radial direction of the mount.

2. A fluid-filled cylindrical elastic mount as defined in claim 1, wherein said at least one rigid protrusion consists of two rigid radial protrusions which are located on axially opposite sides of said wing member.

3. A fluid-filled cylindrical elastic mount as defined n claim 2, wherein at least one of said two rigid protrusions consists of an outward flange formed as part of said inner sleeve.

4. A fluid-filled cylindrical elastic mount as defined in claim 1, wherein said wing member protrudes from said outer sleeve toward said inner sleeve while said at least one rigid protrusion protrudes from said inner sleeve toward said outer sleeve.

5. A fluid-filled cylindrical elastic mount according to claim 4, further comprising a rigid cylindrical support member secured to an inner surface of said outer sleeve, and wherein said outer sleeve includes a stepped portion, said wind member being gripped at a radially outer peripheral portion thereof by and between one of axially opposite ends of said rigid cylindrical support member and said stepped portion of said outer sleeve.

6. A fluid-filled cylindrical elastic mount according to claim 5, wherein said rigid cylindrical support member is made of a metal material.

7. A fluid-filled cylindrical elastic mount according to claim 5, wherein said at least one elastic body consists f two annular rubber bodies disposed at axially opposite end portions of the mount, respectively, said rigid cylindrical support member being secured to said outer sleeve via one of said two annular rubber bodies.

8. A fluid-filled cylindrical elastic mount according to claim 7, wherein said two annular rubber bodies, said wind member and said inner sleeve cooperate with each other to define an annular fluid chamber as said at least one fluid chamber, said annular fluid chamber being divided into two sections which are partially defined by said two annular rubber bodies, respectively.

9. A fluid-filled cylindrical elastic mount as defined in claim 1, wherein aid at least one elastic body consists of two annular rubber bodies disposed at axially opposite end portions of the mount, respectively, while said at least one fluid chamber consists of an annular fluid chamber which is axially defined between said two annular rubber bodies.

10. A fluid-filled cylindrical elastic mount as defined in claim 9, wherein said at least one rigid protrusion consists of two rigid radial protrusions which are embedded in said two rubber bodies, respectively.

11. A fluid-filled cylindrical elastic mount as defined in claim 1, further comprising two brackets one of which is fitted on said outer sleeve, said two brackets having respective outward flanges at which said two brackets are superposed on each other, said two brackets being fixed at said outward flanges to the other of the two members to be flexibly connected.

12. A fluid-filled cylindrical elastic mount as defined in claim 1,. wherein each of said at least one rigid protrusion is embedded in a corresponding one of said at least one elastic body.

13. A fluid-filled cylindrical elastic mount as defined in claim 12, wherein said each rigid protrusion is embedded in a radially inner portion of said corresponding one elastic body, said radially inner portion is radially aligned with said restricted fluid passage.

* * * * *